June 9, 1925. 1,541,527
G. POWELL
HOISTING AND TRANSFERRING MECHANISM
Filed Sept. 8, 1924 5 Sheets-Sheet 1

Inventor:
Gomert Powell
By Gillson, Mann & Cox
Atty's

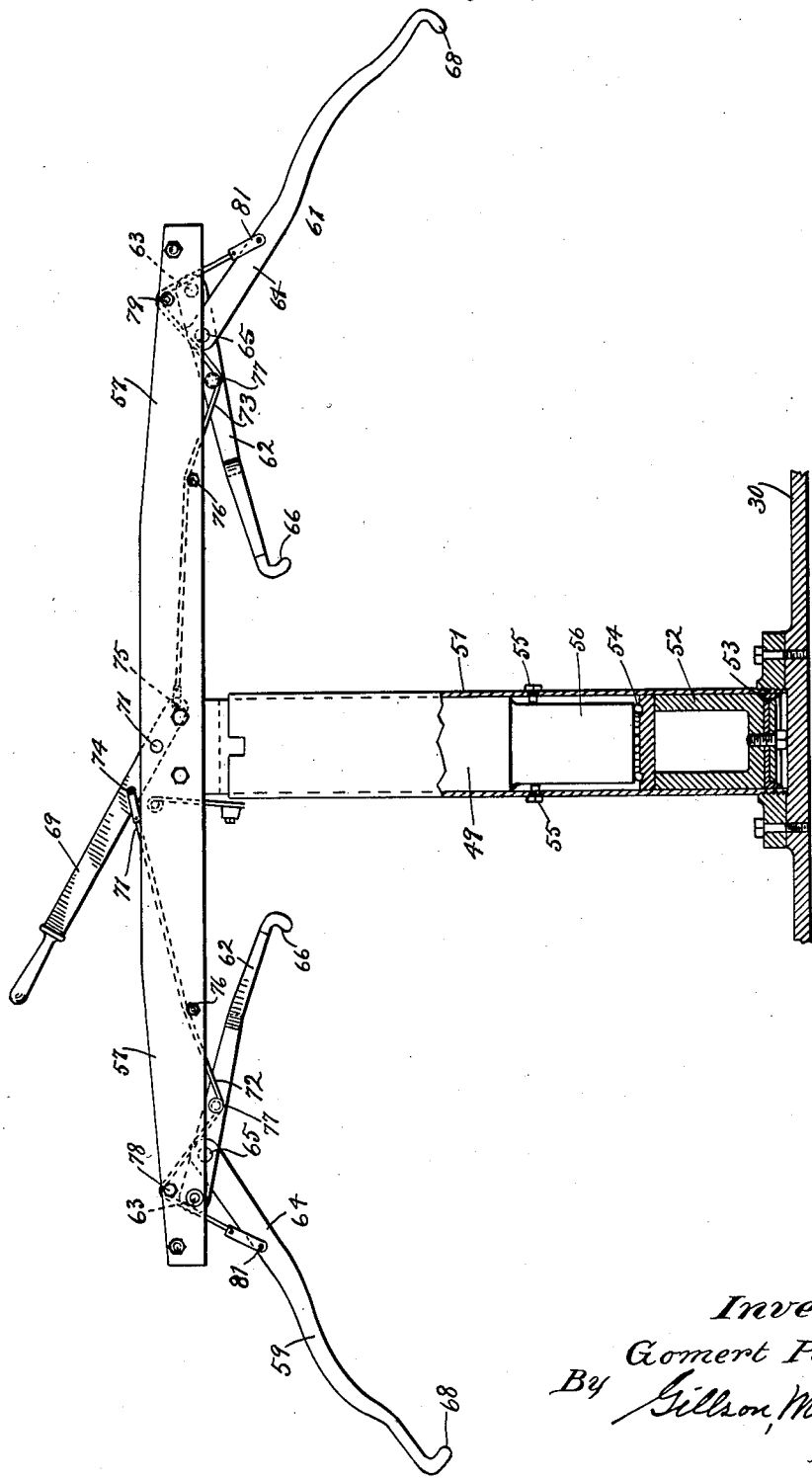

June 9, 1925. 1,541,527
G. POWELL
HOISTING AND TRANSFERRING MECHANISM
Filed Sept. 8, 1924 5 Sheets-Sheet 5
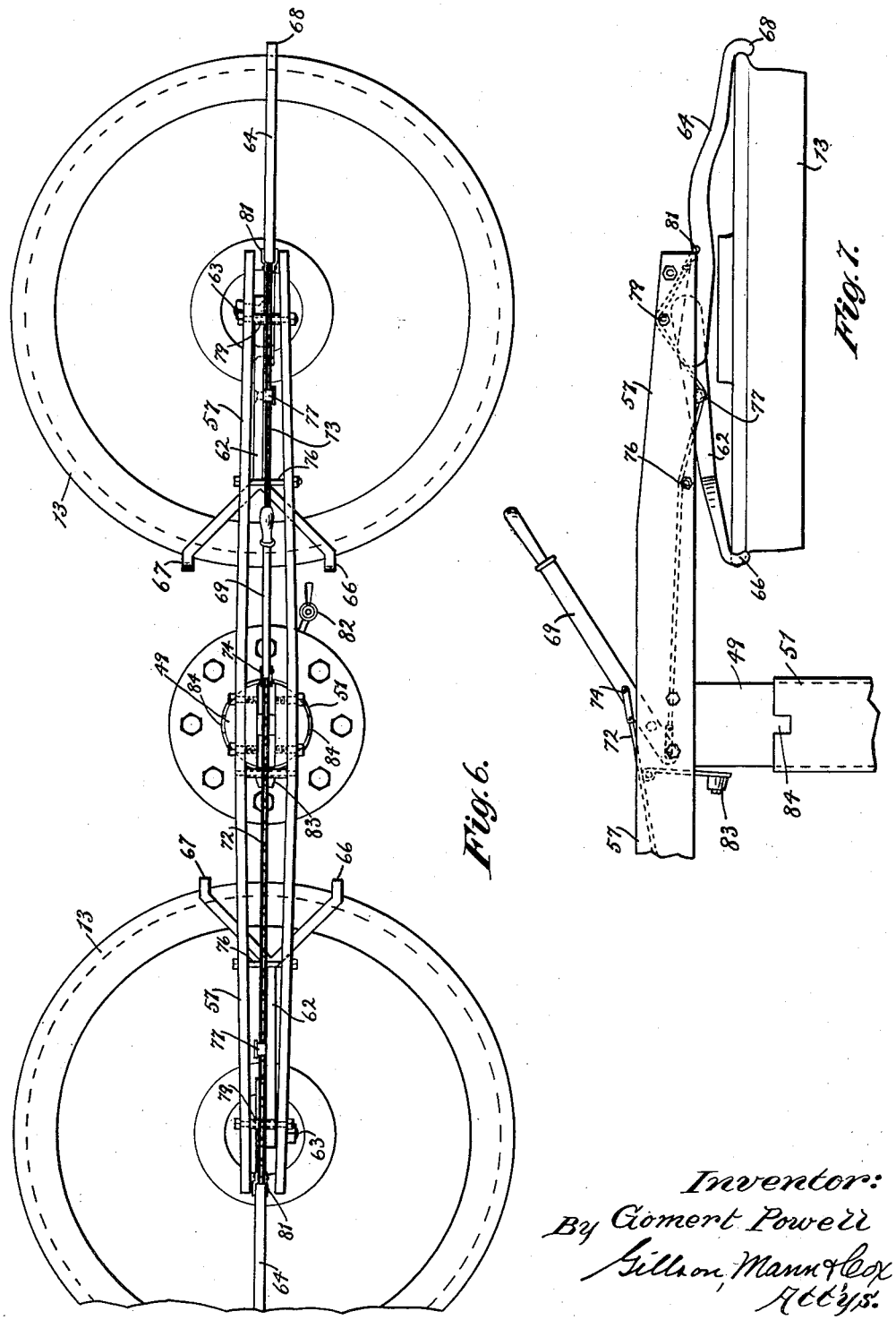
Inventor:
By Gomert Powell
Gillson, Mann & Cox
Att'ys.

Patented June 9, 1925.

1,541,527

UNITED STATES PATENT OFFICE.

GOMERT POWELL, OF MICHIGAN CITY, INDIANA.

HOISTING AND TRANSFERRING MECHANISM.

Application filed September 8, 1924. Serial No. 736,416.

*To all whom it may concern:*

Be it known that I, GOMERT POWELL, a subject of the Kingdom of Holland, and resident of Michigan City, county of Laporte, and State of Indiana, have invented certain new and useful Improvements in Hoisting and Transferring Mechanism, of which the following is a specification, and which are illustrated in the accompanying drawings, forming a part thereof.

This invention relates to hoisting and transferring mechanism employed in the manufacture of heavy articles in machine shops.

One of the objects of the invention is the provision of new and improved mechanism for hoisting car wheels and the like, from the floor of a machine shop, and placing them in position on a tool table to be operated upon during the process of their manufacture, and for removing them and lowering the same after they have been operated upon.

Another object of the invention is the provision of new and improved means for receiving and hoisting heavy articles, as car wheels, and the like, preparatory to transferring them to a chuck or table to be operated upon, and for lowering said articles after the operation.

A further object of the invention is the provision of new and improved means for lifting heavy articles and transferring them from one position to another during their manufacture.

Other and further objects and advantages of the invention will appear from the following description, taken in connection with the accompanying drawings, in which—

Fig. 5 is a side elevation of the transferring mechanism with parts in section and parts broken away;

Fig. 6 is a plan view thereof; and

Fig. 7 is a fragmentary view showing a car wheel suspended by the transferring mechanism.

Figure 1:
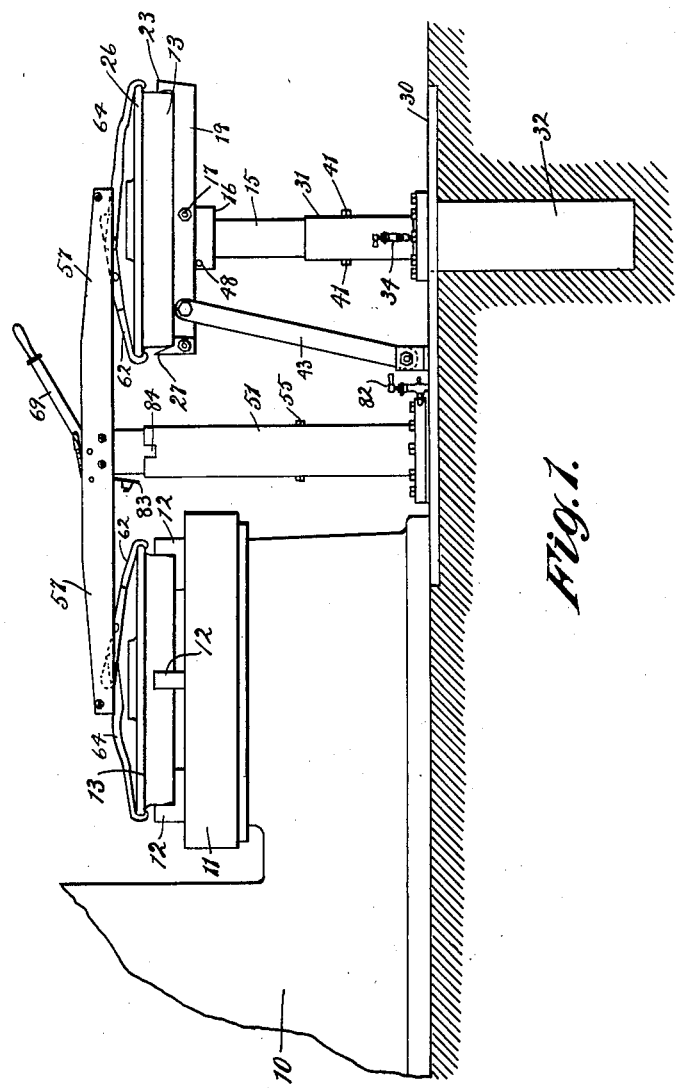
Fig. 1 is a side elevation of a portion of a machine with the hoisting and transferring mechanism associated therewith.

In certain operations in the manufacture of various articles as railway car wheels, it is necessary to hoist the same from the shop floor and place them on a machine table or in the chucks in position to be operated upon. Since car wheels are heavy and unwieldly objects it is desirable that this be done by mechanical means under the control of the operator. Mechanism for accomplishing these functions will now be described.

On the drawing the reference character 10 designates what for simplicity of description will be termed a boring machine of any approved construction. The machine is provided with a boring table 11 having the chucks 12 for receiving and clamping the work or article to be operated upon, as the wheel 13, in the usual manner. Since the details of construction or type of machine employed constitutes no part of the present invention it is not thought necessary to further describe the same, it being understood that the machine 10 may be any machine for performing any of the necessary operations on the work, which for convenience will be termed the wheel 13.

Suitable elevating or hoisting mechanism is provided on which the car wheels 13 may be rolled preparatory to elevating the same, and from which said wheels may be rolled after they have been lowered. As shown, a wheel supporting member 14 is movably mounted on shaft 15 which constitutes a piston, as by being connected to the square cap 16 by the pivot bolt or rod 17. The cap 16 is rigidly secured to the shaft or piston 15 as by means of the cap screw 18 tapped in the end of said piston.

Figures 3, 4:
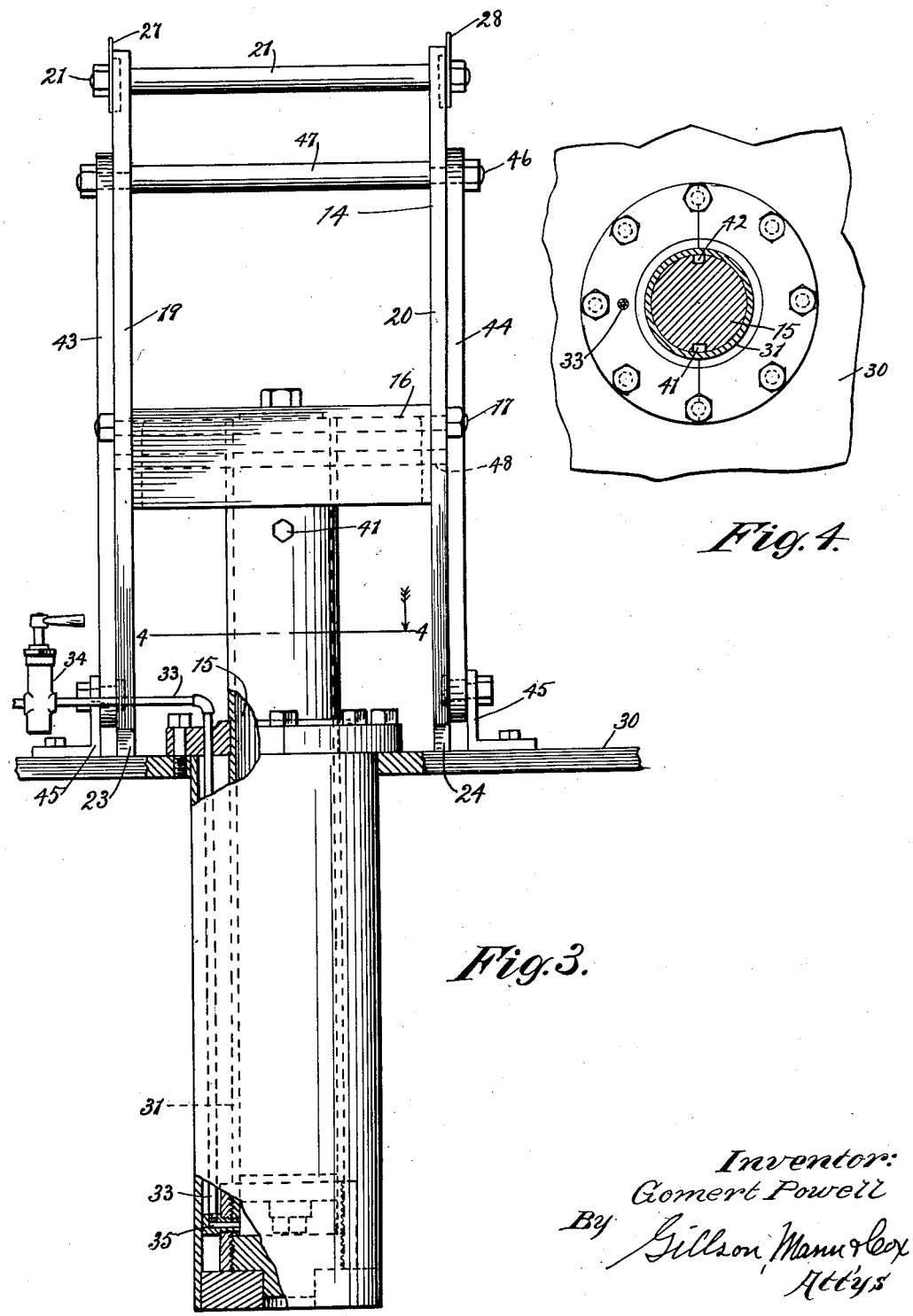
Fig. 3 is a side elevation of the hoisting mechanism at right angles to that shown in Fig. 2.
Fig. 4 is a section on line 4—4 of Fig. 3.

The wheel supporting member comprises the side plates 19 and 20 connected together at their upper ends as by means of the bolt or rod 21 and held in spaced relation by the sleeve 22 on said bolt or rod. The side plates 19 and 20 are arranged at opposite sides of the cap 16 as clearly shown in Fig. 3. Their lower ends are provided with forwardly extending wheel engaging members 23 and 24 which are adapted to engage the tread 25 of the wheel 13. The members 23 and 24 are of less thickness than the length or height of the flange 26 of the wheel 13 whereby the wheel may be rolled along the floor 30 of the shop on its flange onto the members 23 and 24 and then permitted to fall over against the side bars 19 and 20 to free the flange from the floor. The upper ends of the side bars are provided with projecting members 27 and 28 having inwardly inclined surfaces 29 which are adapted to guide the wheel in proper position on to the wheel supporting member 14. The members 23, 24, 27 and 28 engage the wheel at four different points and consequently hold the same from moving laterally while it is on the supporting member 14.

The wheel supporting member 14 is adapted to be elevated in any suitable manner. Preferably it is elevated by a piston 15 operating in a cylinder 31 the lower end of which is mounted in the casing 32 extending beneath the floor 30. The piston may be elevated by compressed air which enters through the pipe 33 and is controlled by the valve 34 in the usual or any suitable manner. The air enters beneath the piston 15, which is provided with suitable cup-shaped flexible packing 36 which expands and makes an airtight joint between the piston and the cylinder. The weight of the device lowers the same when the valve 34 is operated to exhaust the air from the cylinder. Any suitable valve for controlling the entrance to and escape of air from the cylinder 31 through the port 35 beneath the piston 15 may be employed.

Means are provided for preventing turning of shaft or piston 15 in the cylinder 31. As shown, one or more screws 41 secured in the cylinder are adapted to engage corresponding slots or grooves 42 in the piston. They not only prevent the piston from turning but also limit its upward movement by engaging the bottom of said slots.

Suitable means are provided for turning the wheel supporting member 14 in horizontal position while it is being elevated. One means for accomplishing this result comprises links 43 and 44 pivoted to suitable brackets 45 at the base of the machine. The upper ends of the links 43 and 44 are pivotally connected to the side plates 19 and 20 as by means of the pivot bolt or rod 46, a sleeve 47 being interposed between the side members 19 and 20. A pin 48 extending through the cap 16 is adapted to engage the side plates 19 and 20 when they are in horizontal position and limit the further upward movement of the piston 15.

Figure 2:
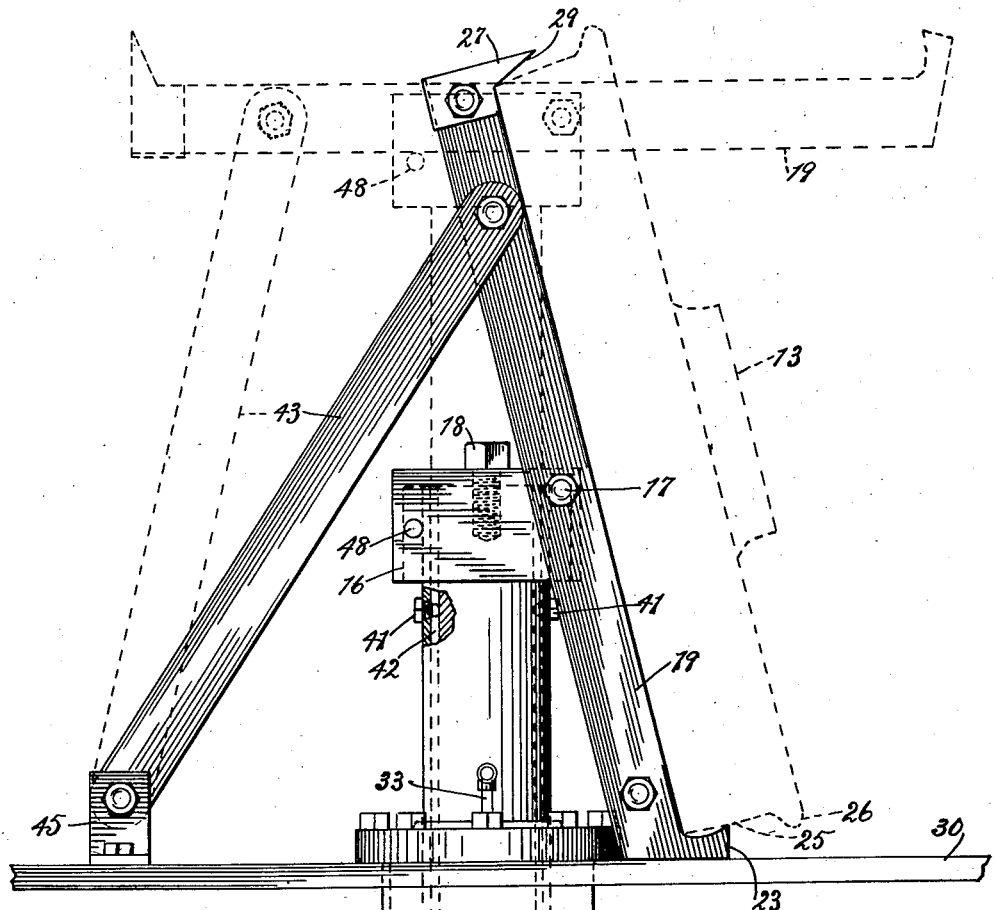
Fig. 2 is a side elevation of a hoisting mechanism, with parts in section and parts broken away.

In the operation of the device the piston is lowered to the position shown in Fig. 2, the wheel 13 is rolled alongside and between the members 23 and 24, with the tread portion 25 above said members, and then turned over on the wheel-supporting member 14. The valve 34 is then operated to supply compressed air beneath the piston to elevate the same. The links 43 and 44 will cause the wheel-supporting member to rotate about the pivot 17 as the piston 15 ascends until the piston is stopped by the pin 48 and the stop screws 41. The wheel-supporting member will then be in horizontal position, as shown in dotted lines in Fig. 2.

Suitable means are provided for transferring the wheel, or other work, from the hoisting mechanism to the table 11 of the machine 10. Any appropriate means may be employed for this purpose. In the form of the device selected to illustrate one embodiment of the invention, a rotating transfer mechanism is employed comprising a standard or supporting member 49 (see Figs. 5 and 6), slidably and rotatably mounted in a cylinder 51, which in turn is suitably secured to the floor 30 of the shop. A piston 52 beneath the standard 49 is adapted to elevate the same. Since the rotation of the piston 52 would soon destroy the packing member 53 of the piston, anti-friction bearings 54 may be, and preferably are, interposed between the said standard and piston.

Means are provided for limiting the upward movement of the piston 52. Stop screws 55 may be provided for this purpose. The inner ends of the screws are adapted to engage the upper end of the piston when the same has been elevated sufficiently to lift the wheels from the chuck 12 and wheel holder member 14 as will presently appear. The lower end of the shaft 49 is reduced as at 56 for accommodating the screws 55.

Two laterally extending arms or supports 57 are rigidly connected to the upper end of the shaft or standard 49. As shown, these supports are formed by the ends of a cross arm and comprise two bars spaced apart as clearly shown in Fig. 6. The arms or supports 57 are of substantially the same length and are provided with wheel or work clamping members or engaging devices 59 and 61.

Each wheel engaging device comprises an arm 62 pivoted as at 63 to the corresponding support 57 and a second arm 64 pivoted as at 65 to said first named arm 62. The arm 62 may be and preferably is provided with forks terminating in fingers 66 and 67 for engaging the flange of a car wheel. The outer end of the arm 64 is also provided with a finger 68 opposite the fingers 66 and 67 for engaging said flange preparatory to lifting the wheel. The parts are so arranged that the weight of the wheel will cause the hooks to clamp the flange of the wheel sufficiently to support the latter, as clearly shown in Figs. 6 and 7 of the drawings.

Any suitable means may be provided for releasing the wheel or work engaging devices when the wheel or other work has been placed in position by the transfer mechanism. Preferably the work engaging devices are released simultaneously by a single lever 69 pivoted intermediate its end as at 71. Flexible members 72 and 73 secured to the lever 69 above and below the pivot as at 74 and 75 respectively extend outwardly over guides 76 on the arms 57 beneath guides 77 on the short arms 62, over guides 78 and 79, respectively, of the arms 57, and are then secured to the long arms 64, as at 81, whereby, when the standard 49 has been lowered to position the wheels or other work, the wheel flange engaging members may be released by moving the lever downward from the position shown in Fig. 1.

When the lever 69 is moved to release the wheel engaging members 59 and 61, the operator, by operating the valve 82, introduces compressed air beneath the piston 52 to raise the transfer mechanism 57 free of the work, and gives the same a quarter turn. If desired, the valve 82 may now be operated to exhaust the air to lower the device, whereupon the latch 83 will engage the notch 84 and hold the said device in fixed inoperative position while the wheel is being bored or other operations performed.

Any suitable valve mechanism may be employed, as conventionally shown. Since the details of the valve mechanism constitute no part of the present invention the same will not be further described.

In operation, assuming a wheel is being operated upon in the chucks, and the hoist lowered with a finished wheel to the position shown in Fig. 2, the wheel is moved to vertical position so the flange 26 will engage the floor and permit the wheel to be rolled from the support, and a new wheel rolled alongside and toppled over onto the support. The hoist is elevated to the position shown in Fig. 1, the transfer mechanism is turned to position for the wheel engaging members to engage the wheel on the hoist, and the one on the chuck that has been operated on, the transfer mechanism is elevated, raising the wheels from the chuck and support, the transfer mechanism is now turned through 180° and lowered, the wheels released, the transfer mechanism again elevated and turned 90° so as to be out of the way. The wheel in the chuck is operated upon while the hoist is lowered to deposit the completed wheel on the floor and receive another wheel, thus completing the cycle.

The wheel engaging devices of the transfer mechanism will assume the position shown in Fig. 5 when the lever 69 is released, whereby when they are elevated above and lowered onto a wheel the fingers 66 and 67 will automatically travel outwardly along the surface of the wheel and fall over the flange 26 thereof, ready to grip the same when they are elevated.

It is thought from the foregoing taken in connection with the accompanying drawings that the construction and operation of my device will be apparent to those skilled in the art. Various changes in size, shape, proportion and details of construction may be made without departing from the spirit and scope of the appended claims.

I claim as my invention:

1. In combination, a machine table, a hoisting machine adapted to elevate work to be operated upon, means for tilting the work on said hoisting machine, and transferring mechanism for transferring said work from said hoisting machine to said table.

2. In combination, a machine table, a hoisting device, comprising a vertically movable piston, a wheel supporting member pivoted to said piston, means for causing said member to assume an inclined position when said piston is in lowered position for receiving a flanged wheel to be operated upon, and for moving said member to horizontal position so that said wheel will assume a horizontal position.

3. In combination, a machine table, a wheel hoist, and vertically movable, rotatable means for transferring work to be operated upon from said hoist to said table, the said means including an outwardly projecting member having oppositely disposed pivoted arms mounted thereon.

4. In combination, a machine table, a hoist adapted to elevate an article from the floor of a shop, means for transferring said article from said hoist to said table, the same means including a plurality of simultaneously operable article-holding mechanisms.

5. A hoisting device comprising a vertically movable standard, a wheel support on said standard, means for holding said support at an angle to said standard for receiving a wheel, said means causing said support to assume a horizontal position when said standard is in elevated position.

6. A hoisting device for flanged wheels comprising a vertically movable standard, a wheel support movably connected to said standard, and means for moving said support at an acute angle to said standard when the same is in lowered position, for receiving a wheel, and for moving said support at substantially right angles to said standard when the latter is in elevated position.

7. In a transferring mechanism, a rotatable standard, laterally extending arms secured to said standard, clamping members pivoted to the outer end of each arm, and means for raising and lowering said standard.

8. In a transferring mechanism, a rotatable standard, a laterally extending supporting member secured to said standard, a clamping device secured to the outer end of said member, said clamping device comprising an arm pivoted at its inner end to said member, a clamping finger on the outer end of said arm, a second arm pivoted to said first named arm, and extending in the opposite direction therefrom, a clamping finger on the outer end of said second arm, and means for elevating said arms to release said clamping fingers.

9. A transferring mechanism comprising a cylinder, a piston vertically movable in said cylinder, a standard rotatably mounted on the upper end of said piston, antifriction bearings between said piston and standard, oppositely extending arms mounted on said standard, wheel engaging members carried by said arms, means for releasing said members, and means for locking said standard to prevent rotation thereof.

10. In a transferring mechanism, a standard, means for vertically moving said standard, an arm extending laterally from said standard, a wheel-engaging device carried by said standard, said device comprising a pair of supporting members pivoted together, means for pivotally connecting said members to said arm, said members terminating in fingers for engaging the flange of a wheel, and means including a lever for elevating said members for releasing said fingers from said flange.

11. In a transferring mechanism, a rotatable standard, a plurality of laterally extending arms secured to said standard, clamping members rigidly secured to said arms, means for simultaneously operating said clamping members, and means for raising and lowering the said standard.

GOMERT POWELL.